United States Patent Office 3,548,458
Patented Dec. 22, 1970

3,548,458
APPARATUS FOR DRAWING A PLASTIC SHEET
Sol Goodman, 20310 Kentfield, Detroit, Mich. 48219
Filed June 13, 1967, Ser. No. 645,733
Int. Cl. B29c 17/00
U.S. Cl. 18—19
4 Claims

ABSTRACT OF THE DISCLOSURE

A frame mounted to a pair of overhead tracks is horizontally movable between a work-station over a floor-mounted bed, and a transfer station, laterally spaced from the bed. A die support member carried by the frame is vertically adjustably movable between raised and lowered positions by a jack screw. The jack screw provides means for lowering an upper die into operative engagement with a complementary die mounted on the bed in a precisely controlled movement.

BACKGROUND OF THE INVENTION

(1) Field of the invention

This invention relates to apparatus for drawing a flat sheet of a plastic material into a predetermined cross-section by a pair of complementary die sections which engage the sheet by relative movement along an axis perpendicular to the plane of the sheet and more particularly to such an apparatus wherein a jack screw arrangement produces the relative movement of one die toward the other and including separate, support means for each of the dies so that there is no interference between the dies to the transfer of the workpiece.

(2) Description of the prior art

Sheets of thermoplastic material such as the acrylic plastics are normally formed from a relatively thin flat sheet into a predetermined bubble-like shape by heating the sheet in a suitable oven until it is pliable, and then disposing the heated sheet between a pair of cooperating dies which are brought toward one another to deform the sheet into the desired shape. This is the conventional method for making plastic panels for illuminated signs and the like.

Conventional presses for forming plastic sheets comprise an upright frame having a fixed bed for supporting a lower female die section and a movable head supported at the upper portion of the frame which carries a male die section for movement between vertical positions toward and away from the female die section. Hydraulic or pneumatic power rams are the conventional means employed to drive the upper die section into engagement with the lower die section and the plastic sheet.

Hydraulic and pneumatic drive rams have a serious drawback as a power source for controlling the downward movement of the upper die section. The reason is that it is difficult to precisely control the movement of the upper die section as it deforms the plastic sheet. Thus the depth of the draw that can be achieved for a given sheet thickness is limited because of undesirable thinning of the sheet that results from a deep draw.

A second shortcoming of conventional presses for forming plastic sheets is their limitation to a particular size sheet. Plastic sheets normally come in standard sizes such as 6 ft. by 6 ft., 8 ft. by 8 ft., and up to 12 ft. by 12 ft. dimensions. Such presses are adapted to accommodate a fixed sheet size so that a press designed for a particular sheet size cannot accommodate sheet sizes of a larger dimension.

Still another drawback of conventional presses is that the upright support members of the frame interfere with access to the working area. Heretofore it has been common practice to mount the upper die supporting unit by a relatively substantial upright column connected to the floor mounted bed in order to accommodate substantial vertical working stresses when the two die sections are brought together. This concept is a carryover from presses which are intended to deform sheets of material offering a relatively high resistance to the engagement of the dies.

The broad purpose of the present invention is to provide apparatus for drawing sheets of thermoplastic material which permits a deeper drawing than conventional machines by a jack screw arrangement for raising and lowering the upper die, and which will accommodate any standard size sheet by separating the mounting structure carrying the upper die from a floor-mounted bed.

SUMMARY

The preferred embodiment of the present invention, which will be subsequently described in greater detail, comprises a floor-mounted base. A lower die section is supported on the upper surface of the base. A sheet of thermoplastic material is clamped to the lower die section after it has been preheated in an oven to a relatively pliable, deformable state.

A pair of spaced parallel I beams are mounted to a suitable overhead structure above the base such as the ceiling of the building housing the apparatus. A generally U-shaped frame having downwardly depending legs is mounted by roller means to the I beams so it is movable between horizontal positions traversing the base. A die support member is mounted to the legs of the frame for guided vertical movement. A jack screw depending downwardly from the mid-section of the frame is engaged with the support member so that rotation of the jack screw moves the support member between raised and lowered positions. An upper die section having a surface complementary to the surface of the lower die section is carried by the support member.

Because the plastic sheets are in a very pliable state when they are clamped on the lower die section there is very little resistance or back pressure to the downward movement of the upper die section. Thus the conventional upright columns connecting the base and the upper die supporting components which are necessary in press apparatus employed in forming sheets of metal and the like are not necessary. The absence of these columns allows the preferred apparatus to accommodate any size of plastic sheet.

The overhead I beams permit the upper die section to be laterally displaced with respect to the lower die section to a position permitting unlimited working access to the base so that the preheated plastic sheet can be quickly clamped in place with a minimum of heat loss between the time the sheet is removed from the oven and the time it is in position to be deformed by the dies.

The third major advantage of the preferred embodiment over conventional apparatus of this character is the jack screw arrangement for raising and lowering the upper die instead of the usual hydraulic or pneumatic drive means. The jack screw allows a substantially greater draw to be achieved in a sheet of a given thickness without excessive thinning of the material. Thus for example an 8 inch draw in a $3/16$ inch sheet of plastic has been achieved in the preferred drawing apparatus as compared with only a four inch draw in a conventional hydraulic press. The reason for this is that more precise control can be maintained over the downward movement of the upper die section as it mates with the lower die section. As the plastic is deformed from its initial and final shape, the internal stresses produced in the plastic are never sufficient to produce an uneven stretching.

It is therefore an object of the present invention to provide an apparatus for forming a sheet of plastic material by upper and lower complementary die sections, each of the die sections being supported by physically separate mounting structure.

Another object of the present invention is to provide apparatus for forming a sheet of thermoplastic material by a pair of complementary die sections, including a lower die section mounted on a floor mounted base and an upper die section movable between lower and raised positions by a jack screw arrangement which is supported by an overhead mounting structure.

It is a still further object of the present invention to provide an improved apparatus for forming sheets of plastic material by a pair of complementary die sections which will accommodate any standard size sheets by providing a base for supporting the sheet and a lower die, a frame mounted to an overhead structure with a movable supporting member reciprocal between upper and lower positions, the supporting member carrying an upper die section and the frame and the base being physically separate from one another so that there is no interference to the insertion of an unformed sheet of plastic between the die sections.

Other objects and advantages will readily occur to one skilled in the art to which the invention pertains upon reference to the following detailed description.

DESCRIPTION OF THE DRAWINGS

The description refers to the accompanying drawings in which like reference characters refer to like parts throughout the several views and in which.

DESCRIPTION OF THE PREFERRED EMBODIMENT

Figure 1:
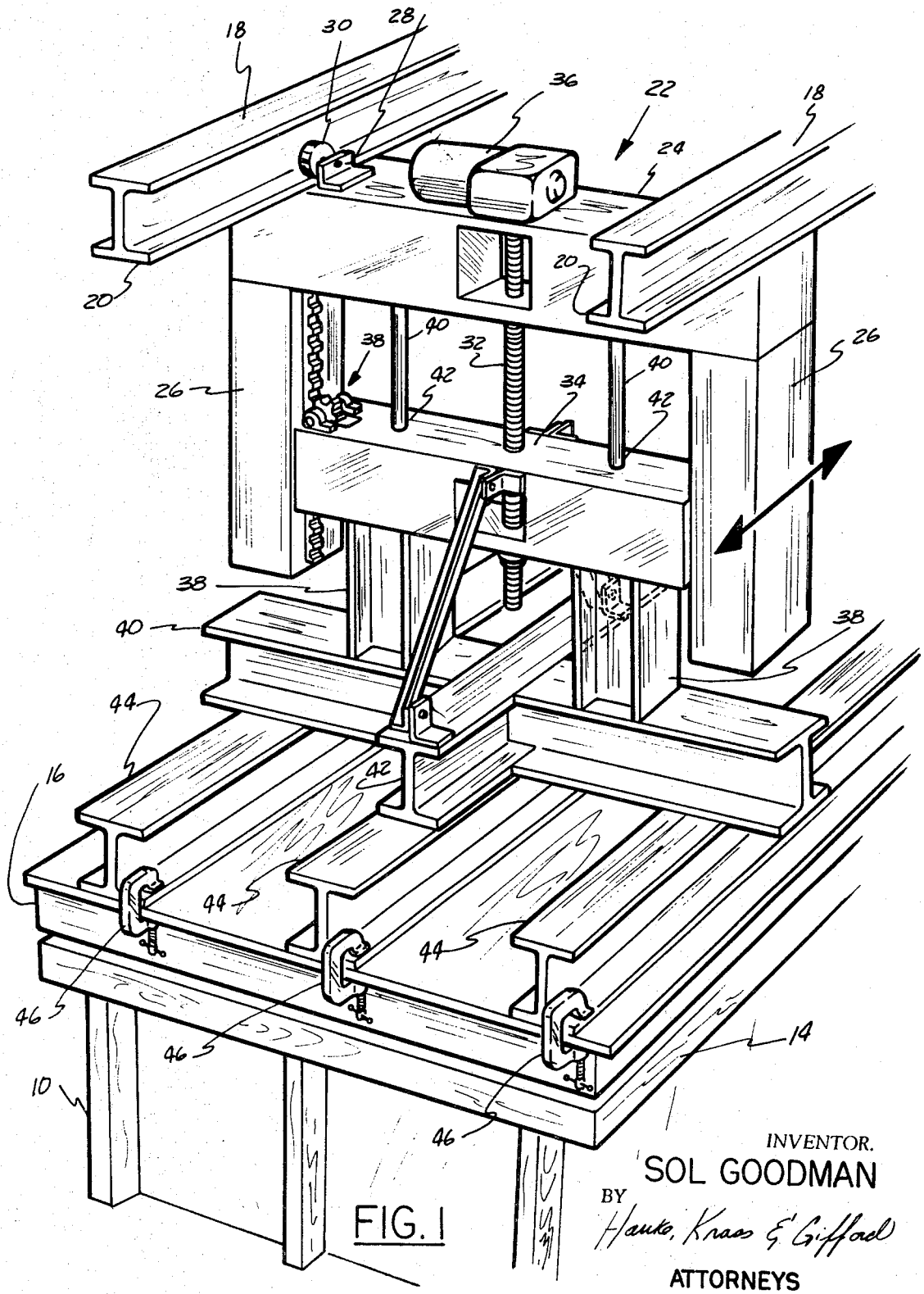
FIG. 1 is a perspective, schematic view of a plastic forming apparatus illustrating the preferred embodiment of the invention.

Now referring to the drawings, a preferred apparatus for forming sheets of plastic material such as acrylic plastics which have been preheated in an oven is illustrated as having a base 10 fixedly mounted to a floor 12 with an upper generally horizontal surface for mounting a female die section 14. The female die section is intended to be mated with a movable male die section 16 and is complementary to the male section 16. The male and female die sections 14 and 16 preferably comprise wooden and metal mating sections which are fabricated by methods well known in the art so that when the two die sections engage one another, a sheet of pliable plastic material disposed therebetween is deformed into a contour corresponding to the die surfaces and takes a permanent set after it has been deformed.

The male and female die sections 14 and 16 are normally clamped or fixed by other temporary means to their supporting members so that the dies can be replaced to accommodate larger or smaller plastic sheets so that the preferred apparatus can accommodate any size of sheet by merely exchanging the dies.

A pair of spaced, parallel I beams 18 are anchored to ceiling structure 19 and above the base 10. The I beams 18 have lower flange sections 20 which provide a horizontal track for mounting a U-shaped frame member 22. The frame 22 includes a horizontal section 24 spanning the beams 18 and a pair of legs 26 depending downwardly from the opposite ends of the section 24. A bracket member 28 fixed to the upper side of the horizontal section 24 adjacent each of the flanges 20 supports a roller member 30 which rides on the upper surface of the flange 20. Thus the rollers 30 suspend the frame 22 from the beams 18 and provide a means for moving the frame 22 to any selected position with respect to the base 10.

A vertical jack screw 32 having its upper end mounted to the horizontal portion 24 depends downwardly to support a horizontal beam 34.

A reversible motor 36 mounted on the horizontal section 24 is coupled to the upper end of the jack screw 32 and arranged to rotate in a first direction wherein the horizontal member 34 is raised and in a second direction for lowering the horizontal member.

The extreme ends of the horizontal beam 34 are connected to the legs 26 preferably by rack and gear means 38 which stabilize the beam 34 as it is raised and lowered. A pair of guide rods 40 extending downwardly from the horizontal section 24 have their lower ends slidably engaged in bores 42 in the horizontal beam 34 and resist any tendency of the beam 34 to rotate as it is raised and lowered by the jack screw 32.

A pair of spaced, downwardly depending support members 38 having their upper ends fixed to the horizontal beam 34 carry a pair of transverse beams 40 and 42 which in turn are rigidly attached to three spaced parallel I beams 44. The I beams 44 provide means for attaching the male die section 16 by clamping means 46.

The jack screw 36 has a pitch such that the upper die supporting assembly consisting of the horizontal beam 34 and the beams 38, 40, 42 and 44 can be lowered as a unit in a very precise manner. This allows the operator to gradually lower the upper die section into engagement with the die section at a rate accommodating the deformation of the plastic sheet so that an uneven thinning of the plastic material does not occur as it is drawn from its initial flat shape to its final contour. This control over the movement of the upper die section thereby permits a greatly increased draw for a die sheet having the same die thickness as compared to a movable die section which is lowered by hydraulic or pneumatic means.

Figure 2:
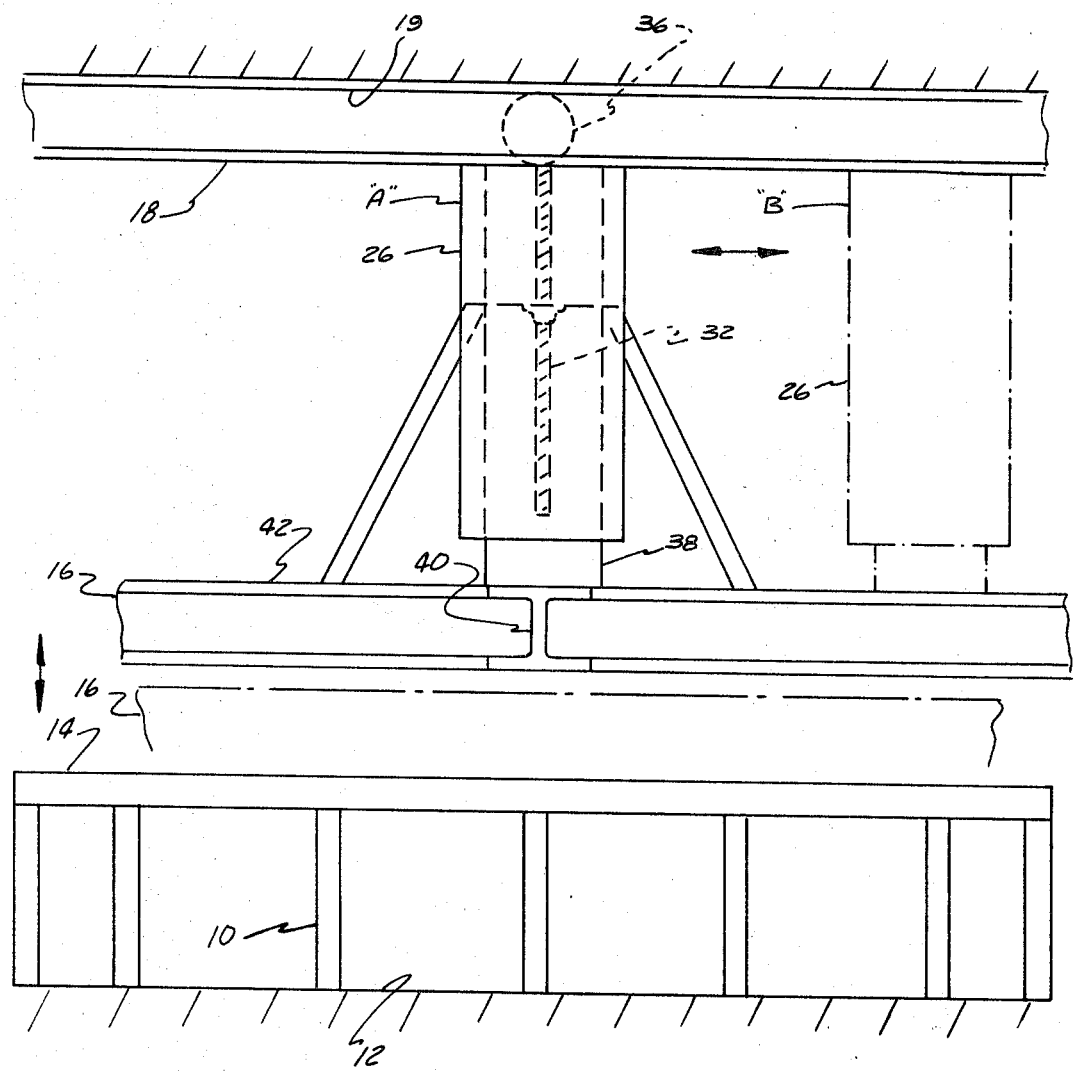
FIG. 2 is an elevational side view of the apparatus shown in FIG. 1.

Referring to FIG. 2, the upper frame 22 is movable between lateral positions such as work station "A" wherein the upper die section 16 is directly over the lower die section 14 and the transfer station "B" indicated in phantom wherein the upper die section is removed from the lower die section so that an unrestricted access is available to the operator to remove the formed plastic sheet or to quickly arrange a preheated unformed plastic sheet in place.

Although I have described only one preferred embodiment of my invention, it is to be understood that various changes and modifications may be made therein without departing from the spirit and the scope of the invention as described in the appended claims.

I claim:

1. In apparatus for drawing a sheet of material, a stationary floor mounted base for supporting a lower die section, track means mounted to an overhead structure above said base, a frame mounted for horizontal movement on said track means along a predetermined path between a first position above said base and a second position laterally spaced from said first position, an upper support member adapted to carry an upper die section, complementary to the lower die section, said support member being mounted for vertical movement between a lower position wherein said upper die section mates with said lower die section to deform a sheet of material and a raised position wherein said upper die section is spaced above said lower die section to permit an undeformed sheet of material to be disposed therebetween, means for lowering said upper support member and said upper die downwardly from said raised position to said lowered position at a controlled velocity comprising a vertical jack having its upper end mounted on said frame and its lower end supporting said upper support member in weight supporting relationship so that rotation of said jack in a first direction raises the upper support member away from said base and rotation of said jack in a reverse direction lowers the upper support member toward said base, said frame comprising a generally U-shaped section having downwardly depending legs and a horizontal portion, said jack screw being mounted to said horizontal portion and including a horizontal support member carried by said jack for movement between raised and lowered positions, the extreme ends of the horizontal support section connected to said legs by rack and gear means arranged to stabilize the horizontal support member as it is moved between its raised and lowered positions.

2. The apparatus as defined in claim 1, wherein said track means comprise a pair of spaced parallel I beams having lateral flanges directed toward one another and including roller members mounted on said frame and riding on said track so that said frame can be moved between selected horizontal positions with respect to said base.

3. The apparatus defined in claim 1, including reversible drive means mounted on the horizontal section of said frame, said drive means coupled to said jack screw and operable to rotate said rack screw in opposite directions to raise and lower said horizontal support member in a controlled manner.

4. Apparatus for use in a building structure having a floor and spaced walls, said apparatus comprising a base mounted to said floor for supporting a lower die section, track means supported by said walls and connected to said base only through said walls, a frame mounted for horizontal movement on said track means along a predetermined path between a first position above said base and a second position laterally spaced from said first position, the frame comprising a fixed horizontal portion and a pair of depending vertical legs connected to the fixed portion, a vertically displaceable horizontal member, and guide means for stabilizing the displaceable horizontal member relative to the fixed vertical legs, an upper support member adapted to carry an upper die section complementary to the lower die section, said support member being connected to the displaceable horizontal member for vertical movement between a lower position wherein said upper die section mates with said lower die section to deform a sheet of material and a raised position wherein said upper die section is spaced above said lower die section to permit an undeformed sheet of material to be disposed therebetween, and a controlled drive rotatable jack screw operatively connected between the fixed horizontal portion and the displaceable horizontal member for lowering said upper support member and said upper die section downwardly from said raised position to said lower position at a controlled velocity.

References Cited
UNITED STATES PATENTS

| | | | |
|---|---|---|---|
| 758,865 | 5/1904 | Shaw | 18—4 |
| 1,009,504 | 11/1911 | Gosselin. | |
| 1,566,251 | 12/1925 | Myers. | |
| 1,924,018 | 8/1933 | Begley et al. | 18—2X |
| 1,960,427 | 5/1934 | Abbott | 18—2X |
| 3,078,516 | 2/1963 | Trammell et al. | 18—19 |
| 3,148,411 | 9/1964 | De Toledo | 18—4 |
| 3,217,356 | 11/1965 | Stutsman | 25—130X |
| 3,360,828 | 1/1968 | Behrens | 18—4X |
| 3,401,424 | 9/1968 | Gionco | 18—19X |

FOREIGN PATENTS

| | | |
|---|---|---|
| 1,030,544 | 6/1953 | France. |

J. SPENCER OVERHOLSER, Primary Examiner